(12) United States Patent
Phillips et al.

(10) Patent No.: US 7,789,791 B2
(45) Date of Patent: Sep. 7, 2010

(54) EIGHT SPEED AUTOMATIC TRANSMISSION

(75) Inventors: Andrew W. Phillips, Saline, MI (US);
James M. Hart, Belleville, MI (US);
Scott H. Wittkopp, Ypsilanti, MI (US);
Clinton E. Carey, Monroe, MI (US);
Madhusudan Raghavan, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 366 days.

(21) Appl. No.: 12/047,050

(22) Filed: Mar. 12, 2008

(65) Prior Publication Data

US 2008/0248914 A1   Oct. 9, 2008

Related U.S. Application Data

(60) Provisional application No. 60/909,856, filed on Apr. 3, 2007.

(51) Int. Cl.
*F16H 3/62* (2006.01)

(52) U.S. Cl. .................. 475/275; 475/311; 475/323; 475/330

(58) Field of Classification Search .................. 475/269, 475/275, 311, 323, 330
See application file for complete search history.

(56) References Cited

U.S. PATENT DOCUMENTS

| | | | |
|---|---|---|---|
| 6,176,803 B1 | 1/2001 | Meyer et al. | |
| 6,558,287 B2 | 5/2003 | Hayabuchi et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,163,484 B2 | 1/2007 | Klemen | |
| 7,582,040 B2 * | 9/2009 | Kamm et al. | 475/282 |
| 2005/0090362 A1 | 4/2005 | Abe et al. | |
| 2006/0270513 A1 | 11/2006 | Klemen | |
| 2006/0270516 A1 | 11/2006 | Klemen | |
| 2008/0242487 A1 * | 10/2008 | Hart et al. | 475/276 |

* cited by examiner

*Primary Examiner*—David D Le

(57) ABSTRACT

An automatic transmission is provided having an input member, an output member, four planetary gear sets, a plurality of coupling members and a plurality of torque transmitting devices. Each of the planetary gear sets includes first, second and third members. The torque transmitting devices may be either clutches or brakes.

31 Claims, 5 Drawing Sheets

| GEAR STATE | GEAR RATIO | RATIO STEP | TORQUE TRANSMITTING DEVICES | | | | |
|---|---|---|---|---|---|---|---|
| | | | 38 | 26 | 28 | 32 | 34 |
| REV | -2.597 | | X | | | X | X |
| N | | -0.56 | O | | | | O |
| 1ST | 4.600 | | X | X | | | X |
| 2ND | 3.003 | 1.53 | X | | X | | X |
| 3RD | 2.013 | 1.49 | | X | X | | X |
| 4TH | 1.625 | 1.24 | | | X | X | X |
| 5TH | 1.288 | 1.26 | | X | | X | X |
| 6TH | 1.000 | 1.29 | | X | X | X | |
| 7TH | 0.818 | 1.22 | X | X | | X | |
| 8TH | 0.653 | 1.25 | X | | X | X | |

X = ON - ENGAGED CARRYING TORQUE
O = ON - ENGAGED NOT CARRYING TORQUE

| GEAR STATE | GEAR RATIO | RATIO STEP | TORQUE TRANSMITTING DEVICES ||||| 
|---|---|---|---|---|---|---|---|
| | | | 138 | 126 | 128 | 132 | 134 |
| REV | -1.903 | | | X | X | | X |
| N | | -0.56 | | O | O | | |
| 1ST | 3.400 | | | X | X | X | |
| 2ND | 2.455 | 1.38 | X | X | X | | |
| 3RD | 1.788 | 1.38 | X | | X | X | |
| 4TH | 1.330 | 1.33 | X | | X | | X |
| 5TH | 1.000 | 1.33 | | | X | X | X |
| 6TH | 0.727 | 1.38 | X | | | X | X |
| 7TH | 0.621 | 1.17 | | X | | X | X |
| 8TH | 0.525 | 1.18 | X | X | | | X |

X = ON - ENGAGED CARRYING TORQUE
O = ON - ENGAGED NOT CARRYING TORQUE

| GEAR STATE | GEAR RATIO | RATIO STEP | TORQUE TRANSMITTING DEVICES ||||| 
|---|---|---|---|---|---|---|---|
| | | | 238 | 226 | 228 | 232 | 234 |
| REV | -2.633 | | X | X | | | X |
| N | | -0.57 | O | O | | | |
| 1ST | 4.638 | | X | X | | X | |
| 2ND | 2.988 | 1.55 | X | X | X | | |
| 3RD | 1.921 | 1.56 | | X | X | X | |
| 4TH | 1.587 | 1.21 | | X | X | | X |
| 5TH | 1.308 | 1.21 | | X | | X | X |
| 6TH | 1.000 | 1.31 | | | X | X | X |
| 7TH | 0.773 | 1.29 | X | | | X | X |
| 8TH | 0.614 | 1.26 | X | | X | | X |

X = ON - ENGAGED CARRYING TORQUE
O = ON - ENGAGED NOT CARRYING TORQUE

FIG. 9

EIGHT SPEED AUTOMATIC TRANSMISSION

CROSS-REFERENCE TO RELATED APPLICATIONS

This application claims the benefit of U.S. Provisional Application No. 60/909,856 filed on Apr. 3, 2007. The disclosure of the above application is incorporated herein by reference.

FIELD

The invention relates generally to a multiple speed automatic transmission having a plurality of planetary gear sets and a plurality of torque transmitting devices and more particularly to an eight speed automatic transmission having four planetary gear sets and a plurality of torque transmitting clutches and brakes.

BACKGROUND

The statements in this section merely provide background information related to the present disclosure and may or may not constitute prior art.

A typical multiple speed automatic transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current automatic transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed automatic transmission.

SUMMARY

An automatic transmission is provided having an input member, an output member, four planetary gear sets, a plurality of coupling members and a plurality of torque transmitting devices. Each of the planetary gear sets includes first, second and third members. The torque transmitting devices may be either clutches or brakes.

One embodiment of the transmission of the present invention includes an input member, an output member, and first, second, third and fourth planetary gear sets each having a sun gear, a carrier member, and a ring gear, wherein the input member is continuously interconnected with the ring gear of the first planetary gear set and the output member is continuously interconnected with the carrier member of the fourth planetary gear set. A first interconnecting member continuously interconnects the sun gear of the first planetary gear set with a stationary member. A second interconnecting member continuously interconnects the carrier member of the first planetary gear set with the ring gear of the second planetary gear set. A third interconnecting member continuously interconnects the carrier member of the second planetary gear set with the carrier member of the third planetary gear set. A fourth interconnecting member continuously interconnects the sun gear of the second planetary gear set with the sun gear of the fourth planetary gear set. A first torque transmitting device is selectively engageable to interconnect at least one of the ring gear of the first planetary gear set and the input member with at least one of the sun gear of the second planetary gear set and the sun gear of the fourth planetary gear set. A second torque transmitting device is selectively engageable to interconnect the ring gear of the third planetary gear set with at least one of the sun gear of the second planetary gear set and the sun gear of the fourth planetary gear set. A third torque transmitting device is selectively engageable to interconnect the ring gear of the third planetary gear set with at least one of the carrier member of the fourth planetary gear set and output member. A fourth torque transmitting device is selectively engageable to interconnect the ring gear of the fourth planetary gear with the sun gear of the third planetary gear set. A fifth torque transmitting device is selectively engageable to interconnect the sun gear of the third planetary gear set with the stationary member. The torque transmitting devices are selectively engageable in combinations of at least three to establish at least eight forward speed ratios and at least one reverse speed ratio between the input member and the output member.

Another embodiment of the transmission of the present invention includes an input member, an output member, and first, second, third and fourth planetary gear sets each having a sun gear, a carrier member, and a ring gear, wherein the input member is continuously interconnected with the carrier member of the third planetary gear set and the output member is continuously interconnected with the ring gear of the fourth planetary gear set. A first interconnecting member continuously interconnects the ring gear of the first planetary gear set with a stationary member. A second interconnecting member continuously interconnects the carrier member of the first planetary gear set with the ring gear of the second planetary gear set. A third interconnecting member continuously interconnects the carrier member of the second planetary gear set with the ring gear of the third planetary gear set. A fourth interconnecting member continuously interconnects the sun gear of the second planetary gear set with the carrier member of the fourth planetary gear set. A first torque transmitting device is selectively engageable to interconnect at least one of the sun gear of the second planetary gear set and the carrier of the fourth planetary gear set with the sun gear of the first planetary gear set. A second torque transmitting device is selectively engageable to interconnect at least one of the ring gear of the second planetary gear set and the carrier member of the first planetary gear set with at least one of the ring gear of the fourth planetary gear set and the output member. A third torque transmitting device is selectively engageable to interconnect at least one of the carrier member of the third planetary gear set and the input member with at least one of the sun gear of the second planetary gear set and the carrier member of the fourth planetary gear set. A fourth torque transmitting device is selectively engageable to interconnect the sun gear of the third planetary gear set with the sun gear of the fourth planetary gear set. A fifth torque transmitting device is selectively engageable to interconnect the sun gear of the third planetary gear set with the stationary member. The torque transmitting devices are selectively engageable in combinations of at least three to establish at least eight forward speed ratios and at least one reverse speed ratio between the input member and the output member.

Yet another embodiment of the transmission of the present invention includes an input member, an output member, and first, second, third and fourth planetary gear sets each having a sun gear, a carrier member, and a ring gear, wherein the input member is continuously interconnected with the sun gear of the third planetary gear set and the output member is continuously interconnected with the ring gear of the fourth planetary gear set. A first interconnecting member continuously interconnects the sun gear of the first planetary gear set with a stationary member. A second interconnecting member continuously interconnects the ring gear of the first planetary gear set with the carrier member of the second planetary gear set. A third interconnecting member continuously interconnects the ring gear of the second planetary gear set with the ring gear of the third planetary gear set. A fourth interconnecting member continuously interconnects the sun gear of the second planetary gear set with the sun gear of the fourth planetary gear set. A first torque transmitting device is selectively engageable to interconnect the carrier member of the first planetary gear set with the carrier member of the fourth planetary gear set. A second torque transmitting device is selectively engageable to interconnect at least one of the carrier member of the second planetary gear set and the ring gear of the first planetary gear set with the carrier member of the third planetary gear set. A third torque transmitting device is selectively engageable to interconnect at least one of the sun gear of the second planetary gear set and the sun gear of the fourth planetary gear set with the carrier member of the third planetary gear set. A fourth torque transmitting device is selectively engageable to interconnect the carrier member of the fourth planetary gear set with at least one of the sun gear of the third planetary gear set and the input member. A fifth torque transmitting device is selectively engageable to interconnect the carrier member of the third planetary gear set with the stationary member. The torque transmitting devices are selectively engageable in combinations of at least three to establish at least eight forward speed ratios and at least one reverse speed ratio between the input member and the output member.

Further objects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 9 is a truth table presenting the state of engagement of the various torque transmitting clutches and brakes in each of the available forward and reverse speeds or gear ratios of the automatic transmission illustrated in FIGS. 7 and 8.

DETAILED DESCRIPTION

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the elements of the four planetary gear sets. These permanent mechanical connections relate the transmission embodiments. More specifically, a first component or element of a first planetary gear set is permanently coupled to a ground, stationary member, or a transmission housing. A second component or element of the first planetary gear set is permanently coupled to a second component or element of a second planetary gear set. A first component or element of the second planetary gear set is permanently coupled to first component or element of a third planetary gear set. Finally, a third component or element of the second planetary gear set is permanently coupled to a third component or element of a fourth planetary gear set.

Figure 1:
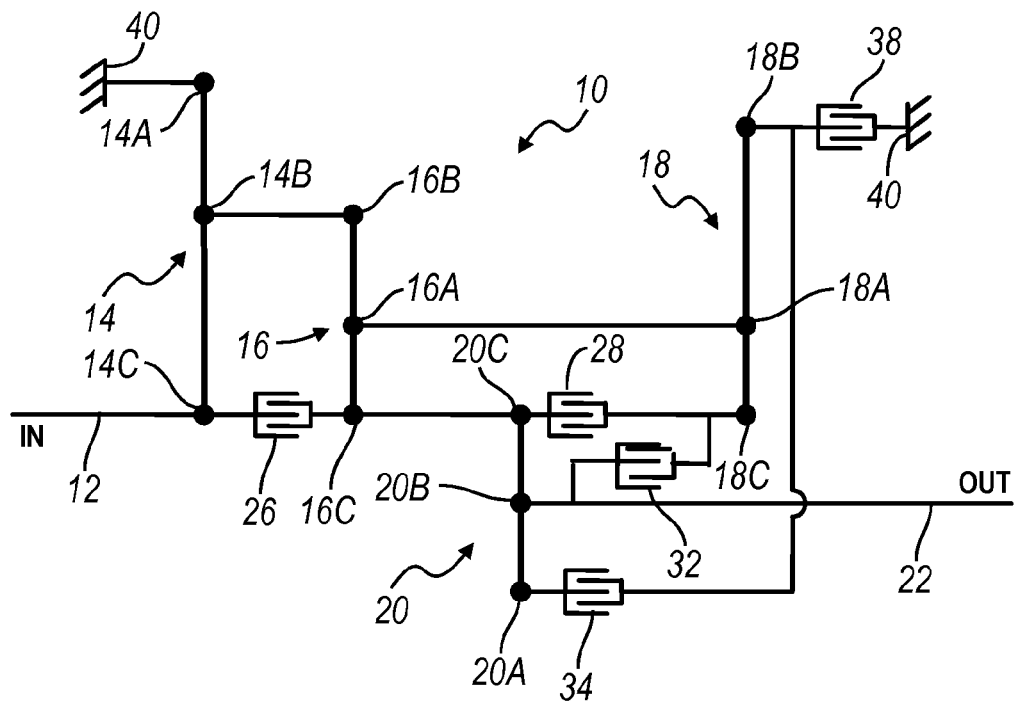
FIG. 1 is a lever diagram of a first embodiment of an eight speed automatic transmission according to the present invention.

Referring now to FIG. 1, a first embodiment of an eight speed automatic transmission 10 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier and one for the ring gear. The relative length between the nodes of each lever can be used to represent the ring-to-sun ratio of each respective gear set. These lever ratios, in turn, are used to vary the gear ratios of the transmission in order to achieve appropriate ratios and an appropriate ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102 entitled "The Lever Analogy: A New Tool in Transmission Analysis" by Benford and Leising, which is hereby fully incorporated by reference.

The automatic transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22. The first node 14A of the first planetary gear set 14 is coupled to ground, stationary member, or transmission housing 40. The second node 14B of the first planetary gear set 14 is coupled to the second node 16B of the second planetary gear set 16. The third node 16C of the second planetary gear set 16 is coupled to the third node 20C of the fourth planetary gear set 20. The first node 16A of the second planetary gear set 16 is coupled to the first node 18A of the third planetary gear set 18.

The input shaft 12 is coupled to the third node 14C of the first planetary gear set 14. The output shaft 22 is coupled to the second node 20B of the fourth planetary gear set 20. The first node 14A of the first planetary gear set 14 is grounded. A first clutch 26 selectively interconnects the third node 14C of the first planetary gear set 14 and the input shaft 12 to the third node 16C of the second planetary gear set 16 and the third node 20C of the fourth planetary gear set 20. A second clutch 28 selectively interconnects the third node 16C of the second planetary gear set 16 and the third node 20C of the fourth planetary gear set 20 to the third node 18C of the third planetary gear set 18. A third clutch 32 selectively interconnects the third node 18C of the third planetary gear set 18 to the second node 20B of the fourth planetary gear set 20 and the output shaft 22. A fourth clutch 34 selectively connects the first node 20A of the fourth planetary gear set 20 to the second node 18B of the third planetary gear set 18. A first brake 38 selectively connects the second node 18B of the third planetary gear set 18 to ground, stationary member, or transmission housing 40.

Figure 2:
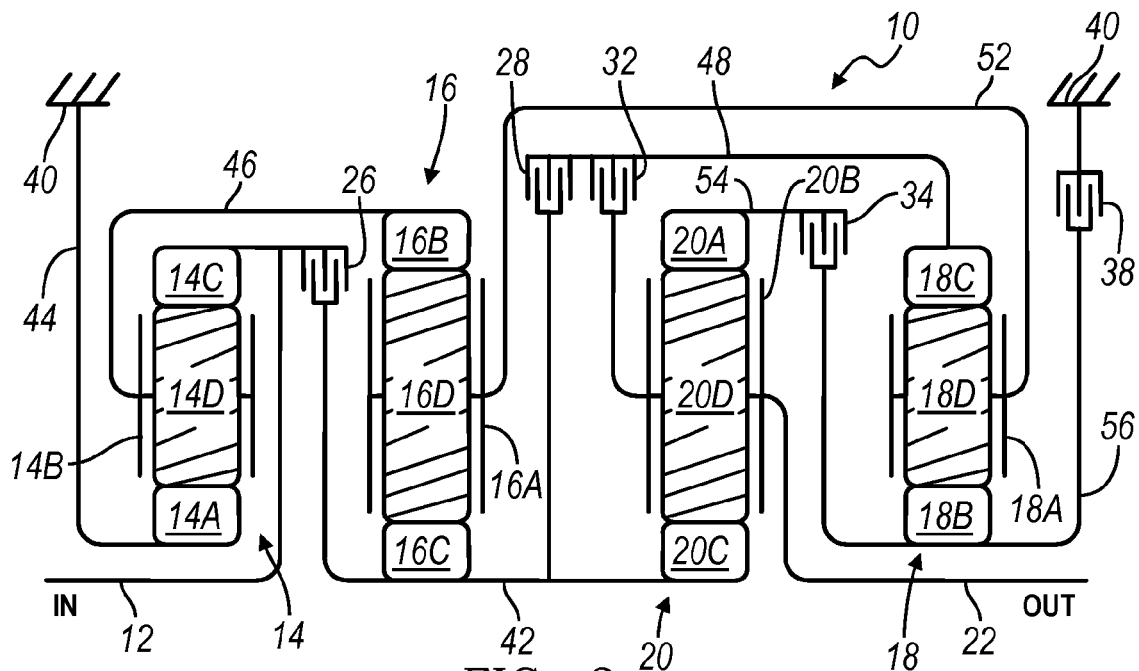
FIG. 2 is a diagrammatic view of a first embodiment of an eight speed automatic transmission according to the present invention.

Referring now to FIG. 2, a stick diagram presents a schematic layout of the first embodiment of the eight speed transmission 10 according to the present invention. In FIG. 2, the numbering from the lever diagram of FIG. 1 is carried over. The clutches, brake and couplings are correspondingly presented whereas the nodes of the planetary gear sets now appear as components of planetary gear sets such a sun gears, ring gears and planet gear carriers having planet gears. The transmission 10 includes the input shaft 12 which is coupled to and directly drives a first ring gear 14C of the first planetary gear set 14. The input shaft 12 is also connected to the first clutch 26 which, when engaged, connects the input shaft 12 through a first shaft or interconnecting member 42 to a second sun gear 16C of the second planetary gear set 16, a fourth sun gear 20C of the fourth planetary gear set 20. The output shaft 22 is coupled to and directly driven by a fourth planet carrier 20B of the fourth planetary gear set 20. The fourth planet carrier 20B includes a plurality of planet gears 20D rotatably disposed thereon.

A second shaft or interconnecting member 44 couples a first sun gear 14A of the first planetary gear set 14 to ground, stationary member, or transmission housing 40. A third shaft or interconnecting member 46 couples the first planet carrier 14B to a second ring gear 16B of the second planetary gear set 16. The first planet carrier 14B includes a plurality of planet gears 14D rotatably disposed thereon. The second clutch 28 selectively connects the first shaft or interconnecting member 42 to a fourth shaft or interconnecting member 48, and the third ring gear 18C of the third planetary gear set 18. When engaged, the second clutch 28 connects the first shaft or interconnecting member 42, the second sun gear 16C of the second planetary gear set 16 and the fourth sun gear 20C of the fourth planetary gear set 20 to a third ring gear 18C of the third planetary gear set 18. The third clutch 32 selectively connects the fourth shaft or interconnecting member 48 with the carrier member 20B. A fifth shaft or interconnecting member 52 couples a second planet carrier 16A of the second planetary gear set 16 to a third planet carrier 18A of the third planetary gear set 18. The second planet carrier 16A includes a plurality of planet gears 16D rotatably disposed thereon and the third planet carrier 18A includes a plurality of planet gears 18D rotatably disposed thereon. A sixth shaft or interconnecting member 54 couples a fourth ring gear 20A of the fourth planetary gear set 20 to the fourth clutch 34. When engaged, the fourth clutch 34 connects the fourth ring gear 20A of the fourth planetary gear set 20 to a third sun gear 18B of the third planetary gear set 18 through a seventh shaft or interconnecting member 56. The seventh shaft or interconnecting member 56 also connects the third sun gear 18B of the third planetary gear set 18 to the first brake 38. When engaged, the first brake 38 connects the third sun gear 18B of the third planetary gear set 18 to ground, stationary member, or transmission housing 40.

Figures 3, 4:
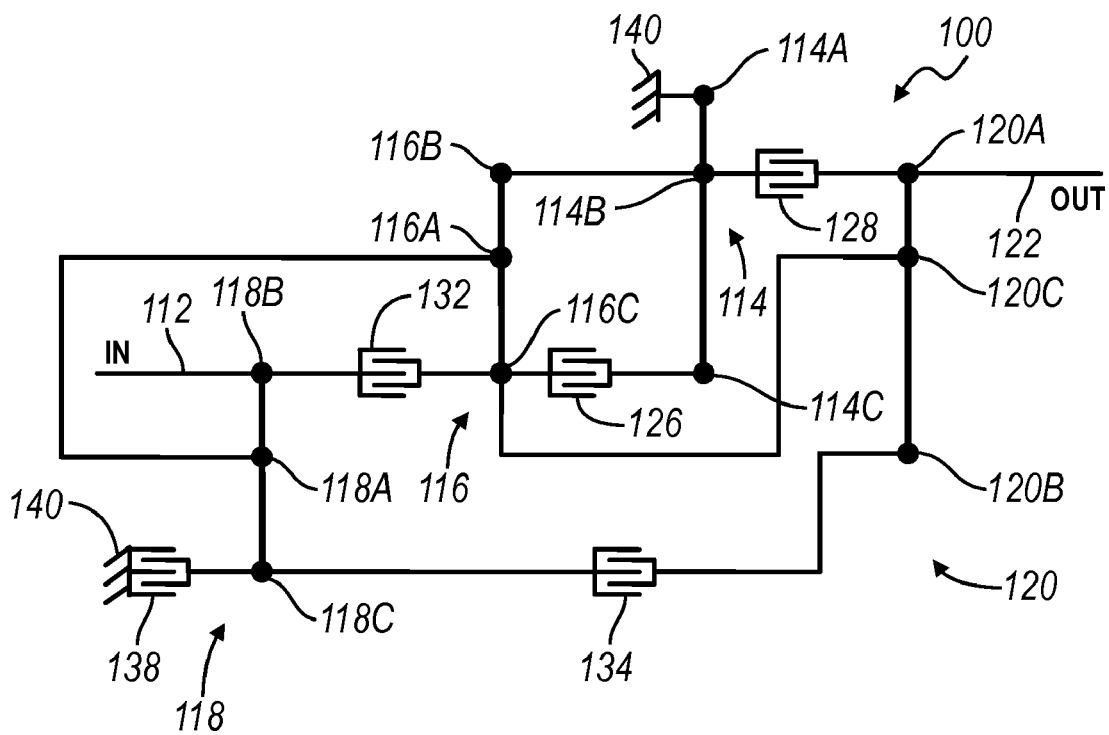
FIG. 3 is a truth table presenting the state of engagement of the various torque transmitting clutches and brakes in each of the available forward and reverse speeds or gear ratios of the automatic transmission illustrated in FIGS. 1 and 2.
FIG. 4 is a lever diagram of a second embodiment of an eight speed automatic transmission according to the present invention.

Referring now to FIGS. 2 and 3, the operation of the first embodiment of the eight speed automatic transmission 10 will be described. It will be appreciated that the automatic transmission 10 is capable of transmitting torque from the input shaft 12 to the output shaft 22 in eight forward speed or torque ratios and one reverse speed or torque ratio. Each forward and reverse speed or torque ratio is attained by engagement of a combination of three of the clutches or brake as will be explained below. FIG. 3 is a truth table presenting the various combinations of clutches and brake that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 10.

To establish forward and reverse speed ratios, three torque transmitting devices are engaged for each gear state. The engaged clutches and brake are represented by an "X" in each respective row. For example, to establish reverse gear, the first brake 38, the third clutch 32 and the fourth clutch 34 are engaged or activated. The first brake 38 grounds the third sun gear 18B of the third planetary gear set 18. The third clutch 32 connects the third ring gear 18C of the third planetary gear set 18 to the fourth planet carrier 20B of the fourth planetary gear set 20 and the output shaft 22. The fourth clutch 34 connects the fourth ring gear 20A of the fourth planetary gear set 20 to the third sun gear 18B of the third planetary gear set 18 which is grounded, as noted directly above, by the first brake 38. Similarly, the eight forward speed ratios are achieved through different combinations of clutch and brake engagement.

It will be appreciated that the operation and gear states of the first embodiment of the eight speed automatic transmission 10 assumes, first of all, that the brake and all clutches not specifically referenced in a given gear state are inactive or disengaged and, second of all, that during gear shifts, i.e., changes of gear state, between at least adjacent gear states, a clutch or brake engaged or activated in both gear states will remain engaged or activated.

Turning now to FIG. 4, a lever diagram for a second embodiment of an eight speed automatic transmission 100 is illustrated. The automatic transmission 100 includes an input shaft 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 118B and a third node 118C, a fourth planetary gear set 120 having three nodes: a first node 120A, a second node 120B and a third node 120C and an output shaft or member 122. The first node 114A of the first planetary gear set 114 is coupled to ground, stationary member, or transmission housing 140. The second node 114B of the first planetary gear set 114 is coupled to the second node 116B of the second planetary gear set 116. The third node 116C of the second planetary gear set 116 is coupled to the third node 120C of the fourth planetary gear set 120. The first node 116A of the second planetary gear set 116 is coupled to the first node 118A of the third planetary gear set 118.

The input shaft 112 is coupled to the second node 118B of the third planetary gear set 118. The output shaft or member 122 is coupled to the first node 120A of the fourth planetary gear set 120. A first clutch 126 selectively connects the third node 114C of the first planetary gear set 114 to the third node 116C of the second planetary gear set 116 and the third node 120C of the fourth planetary gear set 120. A second clutch 128 selectively connects the second node 114B of the first planetary gear set 114 to the first node 120A of the fourth planetary gear set 120 and the output shaft or member 122. A third clutch 132 selectively connects the input shaft 112 and the second node 118B of the third planetary gear set 118 to the third node 116C of the second planetary gear set 116 and the third node 120C of the fourth planetary gear set 120. A fourth clutch 134 selectively connects the third node 118C of the third planetary gear set 118 to the second node 120B of the fourth planetary gear set 120. A first brake 138 selectively connects the third node 118C of the third planetary gear set 118 to ground, stationary member, or transmission housing 140.

Figures 5, 6:
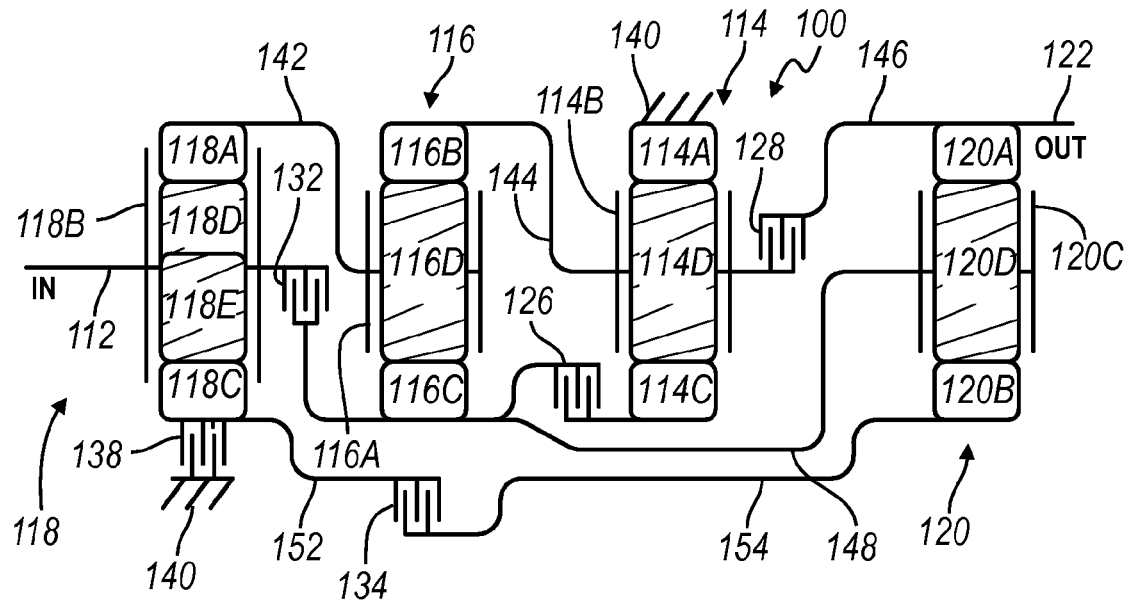
FIG. 5 is a diagrammatic view of a second embodiment of an eight speed automatic transmission according to the present invention.
FIG. 6 is a truth table presenting the state of engagement of the various torque transmitting clutches and brakes in each of the available forward and reverse speeds or gear ratios of the automatic transmission illustrated in FIGS. 4 and 5.

Referring now to FIG. 5, a stick diagram presents a schematic layout of the second embodiment of the eight speed transmission 100 according to the present invention. In FIG. 5, the numbering from the lever diagram of FIG. 4 is carried over. The clutches, brake and couplings are correspondingly presented whereas the nodes of the planetary gear sets now appear as components of planetary gear sets such as sun gears, ring gears and planet carriers having planet gears.

The transmission 100 includes the input shaft 112 which is coupled to and directly drives a third planet carrier 118B of the third planetary gear set 118. The third planet carrier 118B includes a plurality of pairs of planet gears 118D, 118E which are rotatably disposed thereon. Also coupled to and driven by the input shaft 112 is the third clutch 132. The third clutch 132 selectively interconnects the input shaft 112 and the third planet carrier 118B of the third planetary gear set 118 with a second sun gear 116C of the second planetary gear set 116 and a fourth planet carrier 120C of the fourth planetary gear set 120. The fourth planet carrier 120C includes a plurality of pairs of planet gears 120D which are rotatably disposed thereon. The first clutch 126 selectively interconnects the second sun gear 116C of the second planetary gear set 116 and the fourth planet carrier 120C of the fourth planetary gear set 120 with a first sun gear 114C of the first planetary gear set 114. The second clutch 128 selectively connects a first planet carrier 114B of the first planetary gear set 114 to a fourth ring gear 120A of the fourth planetary gear set 120 which is also coupled to and drives the output shaft or member 122. The first planet carrier 114B includes a plurality of planet gears 114D which are rotatably disposed thereon. The fourth clutch 134 selectively connects a third sun gear 118C of the third planetary gear set 118 to a fourth sun gear 120B of the fourth planetary gear set 120. A first brake 138 selectively connects a third sun gear 118C of the third planetary gear set 118 to ground, stationary member, or transmission housing 140.

A first shaft or interconnecting member 142 couples a second planet carrier 116A of the second planetary gear set 116 to a third ring gear 118A of the third planetary gear set 118. A second shaft or interconnecting member 144 couples the first planet carrier 114B of the first planetary gear set 114 to a second ring gear 116B of the second planetary gear set 116. A third shaft or interconnecting member 146 couples the second clutch 128 to the fourth ring gear 120A of the fourth planetary gear set 120 and the output shaft or member 122. A fourth shaft or interconnecting member 148 couples the second sun gear 116C of the second planetary gear set 116, the fourth planet carrier 120C of the fourth planetary gear set 120. A fifth shaft or interconnecting member 152 couples the third sun gear 118C of the third planetary gear set 118 to the fourth clutch 134 and a sixth shaft or interconnecting member 154 couples the fourth clutch 134 to the fourth sun gear 120B of the fourth planetary gear set 120.

Referring now to FIGS. 5 and 6, the operation of the second embodiment of the eight speed automatic transmission 100 will be described. It will be appreciated that the automatic transmission 100 is capable of transmitting torque from the input shaft or member 112 to the output shaft or member 122 in eight forward speed or torque ratios and one reverse speed or torque ratio. Each forward and reverse speed or torque ratio is attained by engagement of a combination of three of the clutches or brake as will be explained below. FIG. 6 is a truth table presenting the various combinations of clutches and brake that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 100.

To establish forward and reverse speed ratios, three torque transmitting devices are engaged for each gear state. The engaged clutches and brake are represented by an "X" in each respective row. For example, to establish reverse gear, the first clutch 126, the second clutch 128 and the fourth clutch 134 are activated or engaged. The first clutch 126 interconnects the first sun gear 114C of the first planetary gear set 114 with the second sun gear 116C of the second planetary gear set 116 and the fourth planet carrier 120C of the fourth planetary gear set 120. The second clutch 128 connects the fourth ring gear 120A of the fourth planetary gear set 120 and the output shaft or member 122 to the first planet carrier 114B of the first planetary gear set 114 which is coupled by the second shaft or interconnecting member 144 to the second ring gear 116B of the second planetary gear set 116. The fourth clutch 134 connects the third sun gear 118C of the third planetary gear set 118 to the fourth sun gear 120B of the fourth planetary gear set 120. Similarly, the eight forward speed ratios are achieved through different combinations of clutch and brake engagement.

It will be appreciated that the operation and gear states of the eight speed automatic transmission 100 assumes, first of all, that the brake and all clutches not specifically referenced in a given gear state are inactive or disengaged and, second of all, that during gear shifts, i.e., changes of gear state, between at least adjacent gear states, a clutch or brake engaged or activated in both gear states will remain engaged or activated.

Figure 7:
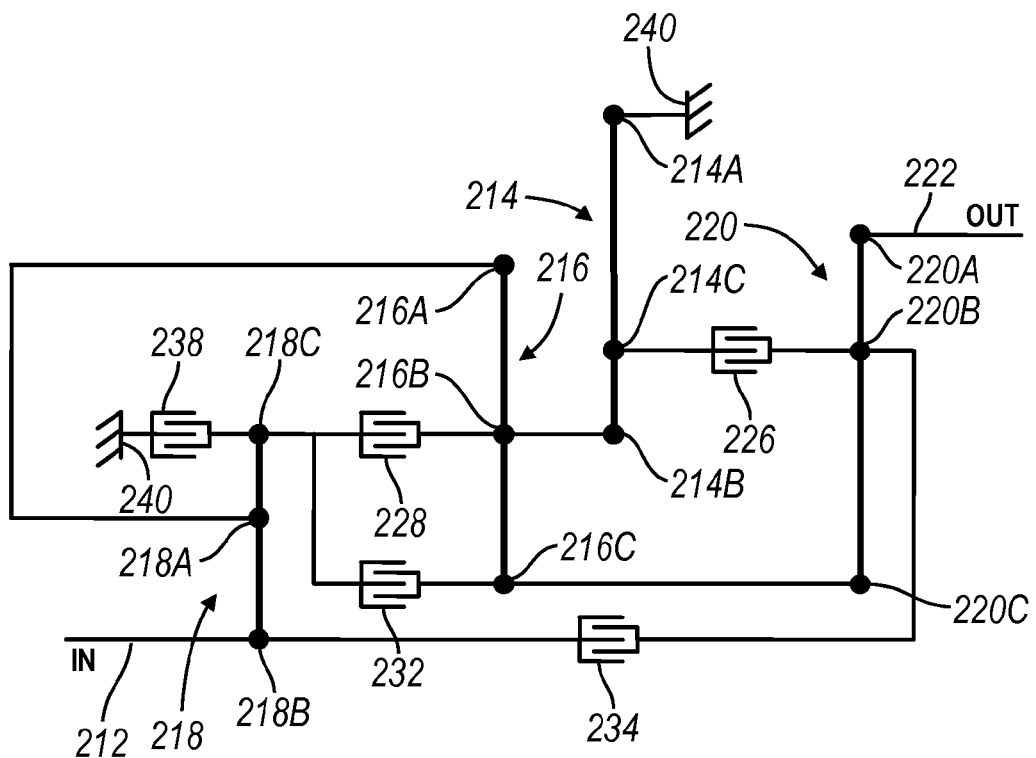
FIG. 7 is a lever diagram of a third embodiment of an eight speed automatic transmission according to the present invention.

Turning now to FIG. 7, a lever diagram for a third embodiment of an eight speed automatic transmission 200 is illustrated. The automatic transmission 200 includes an input shaft or member 212, a first planetary gear set 214 having three nodes: a first node 214A, a second node 214B and a third node 214C, a second planetary gear set 216 having three nodes: a first node 216A, a second node 216B and a third node 216C, a third planetary gear set 218 having three nodes: a first node 218A, a second node 218B and a third node 218C, a fourth planetary gear set 220 having three nodes: a first node 220A, a second node 220B and a third node 220C and an output shaft or member 222. The first node 214A of the first planetary gear set 214 is coupled to ground, stationary member, or transmission housing 240. The second node 214B of the first planetary gear set 214 is coupled to the second node 216B of the second planetary gear set 216. The third node 216C of the second planetary gear set 216 is coupled to the third node 220C of the fourth planetary gear set 220. The first node 216A of the second planetary gear set 216 is coupled to the first node 218A of the third planetary gear set 218.

The input shaft or member 212 is coupled to the second node 218B of the third planetary gear set 218. The output shaft or member 222 is coupled to the first node 220A of the fourth planetary gear set 220. A first clutch 226 selectively connects the third node 214C of the first planetary gear set 214 to the second node 220B of the fourth planetary gear set 220. A second clutch 228 selectively connects the second node 214B of the first planetary gear set 214 and the second node 216B of the second planetary gear set 216 to the third node 218C of the third planetary gear set 218. A third clutch 232 selectively connects the third node 220C of the fourth planetary gear set 220 and the third node 216C of the second planetary gear set 216 to the third node 218C of the third planetary gear set 218. A fourth clutch 234 selectively connects the input shaft or member 212 and the third node 218B of the third planetary gear set 218 to the second node 220B of the fourth planetary gear set 220. A first brake 238 selectively connects the third node 218C of the third planetary gear set 218 to ground, stationary member, or transmission housing 240.

Figure 8:
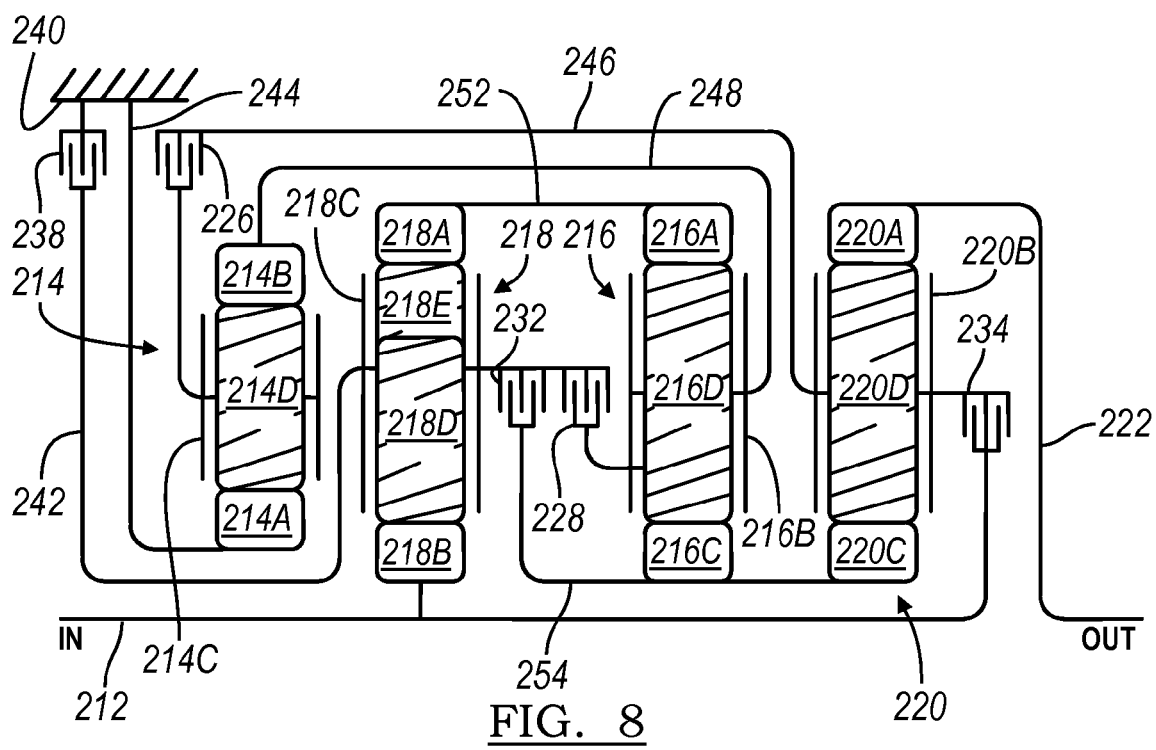
FIG. 8 is a diagrammatic view of a third embodiment of an eight speed automatic transmission according to the present invention.

Referring now to FIG. 8, a stick diagram presents a schematic layout of the third embodiment of the eight speed transmission 200 according to the present invention. In FIG. 8, the numbering from the lever diagram of FIG. 7 is carried over. The clutches, brake and couplings are correspondingly presented whereas the nodes of the planetary gear sets now appear as components of planetary gear sets such a sun gears, ring gears and planet carriers having planet gears.

The transmission 200 includes the input shaft or member 212 which is coupled to and directly drives a third sun gear 218B of the third planetary gear set 218 and the fourth clutch 234. The fourth clutch 234 selectively interconnects the input shaft or member 212 and the third sun gear 218B of the third planetary gear set 218 to a fourth planet carrier 220B of the fourth planetary gear set 220. The fourth planet carrier 220B includes a plurality of planet gears 220D rotatably disposed thereon. The output shaft or member 222 is coupled to and directly driven by a fourth ring gear 220A of the fourth planetary gear set 220. The first clutch 226 selectively interconnects a first planet carrier 214C of the first planetary gear set 214 with the fourth planet carrier 220B of the fourth planetary gear set 220. The first planet carrier 214C includes a plurality of planet gears 214D rotatably disposed thereon. The second clutch 228 selectively connects a second planet carrier 216B of the second planetary gear set 216 to a third planet carrier 218C of the third planetary gear set 218. The second planet carrier 216B includes a plurality of planet gears 216D which are rotatably disposed thereon. The third planet carrier 218C includes pluralities of pairs of planet gears 218D, 218E which are rotatably disposed thereon. The third clutch 232 selectively interconnects the third planet carrier 218C of the third planetary gear set 218 with a second sun gear 216C of the second planetary gear set 216 and a fourth sun gear 220C of the fourth planetary gear set 220. The first brake 238 connects the third planet carrier 218C of the third planetary gear set 218 to ground, stationary member, or transmission housing 240.

A first shaft or interconnecting member 242 couples the third planet carrier 218C of the third planetary gear set 218 to the first brake 238. A second shaft or interconnecting member 244 couples a first sun gear 214A of the first planetary gear set 214 to ground, stationary member, or transmission housing 240. A third shaft or interconnecting member 246 couples the fourth planet carrier 220B of the fourth planetary gear set 220 to the first clutch 226. A fourth shaft or interconnecting member 248 couples a first ring gear 214B of the first planetary gear set 214 to the second planet carrier 216B of the second planetary gear set 216. A fifth shaft or interconnecting member 252 couples a second ring gear 216A of the second planetary gear set 216 to a third ring gear 218A of the third planetary gear set 218. A sixth shaft or interconnecting member 254 couples the second sun gear 216C of the second planetary gear set 216 to the fourth sun gear 220C of the fourth planetary gear set 220.

Referring now to FIGS. 8 and 9, the operation of the third embodiment of the eight speed automatic transmission 200 will be described. It will be appreciated that the automatic transmission 200 is capable of transmitting torque from the input shaft or member 212 to the output shaft or member 222 in eight forward speed or torque ratios and one reverse speed or torque ratio. Each forward and reverse speed or torque ratio is attained by engagement of a combination of three of the clutches and brake as will be explained below. FIG. 9 is a truth table presenting the various combinations of clutches and brake that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 200.

To establish forward and reverse speed ratios, three torque transmitting devices are engaged for each gear state. The engaged clutches and brake are represented by an "X" in each respective row. For example, to engage reverse gear, the first brake 238, the first clutch 226 and the fourth clutch 234 are engaged or activated. The first brake 238 connects the third planet carrier 218C of the third planetary gear set 218 to ground, stationary member, or transmission housing 240 through the first shaft or interconnecting member 242. The first clutch 226 connects the first planet carrier 214C of the first planetary gear set 214 to the fourth planet carrier 220B of the fourth planetary gear set 220. The fourth clutch 234 interconnects the input shaft or member 212 to the fourth planet carrier 220B of the fourth planetary gear set 220. Since the first clutch 226 is also engaged, the input shaft or member 212 is also connected through the fourth planet carrier 220B and the third shaft or interconnecting member 246 to the first planet carrier 214C of the first planetary gear set 214. Similarly, the eight forward speed ratios are achieved through different combinations of clutch and brake engagement per FIG. 9.

It will be appreciated that the operation and gear states of the third embodiment of the eight speed automatic transmission 200 assumes, first of all, that the brake and all clutches not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
   an input member;
   an output member;
   first, second, third and fourth planetary gear sets each having first, second and third members;
   a first interconnecting member continuously interconnecting the first member of the first planetary gear set with a stationary member;

a second interconnecting member continuously interconnecting the second member of the first planetary gear set with the third member of the second planetary gear set;

a third interconnecting member continuously interconnecting the second member of the second planetary gear set with the second member of the third planetary gear set;

a fourth interconnecting member continuously interconnecting the first member of the second planetary gear set with the first member of the fourth planetary gear set; and five torque transmitting devices each selectively engageable to interconnect at least one of the first members, second members, and third members with at least one of another of the first members, second members, third members, and the stationary member; and wherein the torque transmitting devices are selectively engageable in combinations of at least three to establish at least eight forward speed ratios and at least one reverse speed ratio between the input member and the output member.

2. The transmission of claim 1 wherein a first of the five torque transmitting devices is selectively engageable to interconnect at least one of the third member of the first planetary gear set and the input member with at least one of the first member of the second planetary gear set and the first member of the fourth planetary gear set.

3. The transmission of claim 2 wherein a second of the five torque transmitting devices is selectively engageable to interconnect the third member of the third planetary gear set with at least one of the first member of the second planetary gear set and the first member of the fourth planetary gear set.

4. The transmission of claim 3 wherein a third of the five torque transmitting devices is selectively engageable to interconnect the third member of the third planetary gear set with at least one of the second member of the fourth planetary gear set and output member.

5. The transmission of claim 4 wherein a fourth of the five torque transmitting devices is selectively engageable to interconnect the third member of the fourth planetary gear with the first member of the third planetary gear set.

6. The transmission of claim 5 wherein a fifth of the five torque transmitting devices is selectively engageable to interconnect the first member of the third planetary gear set with the stationary member.

7. The transmission of claim 1 wherein the first members are sun gears, the second members are carrier members, and the third members are ring gears.

8. The transmission of claim 1 wherein the input member is continuously interconnected with the third member of the first planetary gear set and the output member is continuously interconnected with the second member of the fourth planetary gear set.

9. The transmission of claim 1 wherein a first of the five torque transmitting devices is selectively engageable to interconnect at least one of the first member of the second planetary gear set and the first member of the fourth planetary gear set with the third member of the first planetary gear set.

10. The transmission of claim 9 wherein a second of the five torque transmitting devices is selectively engageable to interconnect at least one of the third member of the second planetary gear set and the second member of the first planetary gear set with at least one of the third member of the fourth planetary gear set and the output member.

11. The transmission of claim 10 wherein a third of the five torque transmitting devices is selectively engageable to interconnect at least one of the first member of the third planetary gear set and the input member with at least one of the first member of the second planetary gear set and the first member of the fourth planetary gear set.

12. The transmission of claim 11 wherein a fourth of the five torque transmitting devices is selectively engageable to interconnect the third member of the third planetary gear set with the second member of the fourth planetary gear set.

13. The transmission of claim 12 wherein a fifth of the five torque transmitting devices is selectively engageable to interconnect the third member of the third planetary gear set with the stationary member.

14. The transmission of claim 1 wherein the third member of the first planetary gear set, the first member of the second planetary gear set, the third member of the third planetary gear set, and the second member of the fourth planetary gear set are sun gears, the second member of the first planetary gear set, the second member of the second planetary gear set, the first member of the third planetary gear set, and the first member of the fourth planetary gear set are carrier members, and the first member of the first planetary gear set, the third member of the second planetary gear set, the second member of the third planetary gear set, and the third member of the fourth planetary gear set are ring gears.

15. The transmission of claim 1 wherein the input member is continuously interconnected with the first member of the third planetary gear set and the output member is continuously interconnected with the third member of the fourth planetary gear set.

16. The transmission of claim 1 wherein a first of the five torque transmitting devices is selectively engageable to interconnect the third member of the first planetary gear set with the second member of the fourth planetary gear set.

17. The transmission of claim 16 wherein a second of the five torque transmitting devices is selectively engageable to interconnect at least one of the third member of the second planetary gear set and the second member of the first planetary gear set with the third member of the third planetary gear set.

18. The transmission of claim 17 wherein a third of the five torque transmitting devices is selectively engageable to interconnect at least one of the first member of the second planetary gear set and the first member of the fourth planetary gear set with the third member of the third planetary gear set.

19. The transmission of claim 18 wherein a fourth of the five torque transmitting devices is selectively engageable to interconnect the second member of the fourth planetary gear set with at least one of the first member of the third planetary gear set and the input member.

20. The transmission of claim 19 wherein a fifth of the five torque transmitting devices is selectively engageable to interconnect the third member of the third planetary gear set with the stationary member.

21. The transmission of claim 1 wherein the first member of the first planetary gear set, the first member of the second planetary gear set, the first member of the third planetary gear set, and the first member of the fourth planetary gear set are sun gears, the third member of the first planetary gear set, the third member of the second planetary gear set, the third member of the third planetary gear set, and the second member of the fourth planetary gear set are carrier members, and the second member of the first planetary gear set, the second member of the second planetary gear set, the second member of the third planetary gear set, and the third member of the fourth planetary gear set are ring gears.

22. The transmission of claim 1 wherein the stationary member is a transmission housing.

23. A transmission comprising:
an input member;
an output member;
first, second, third and fourth planetary gear sets each having first, second and third members, wherein the input member is continuously interconnected with the third member of the first planetary gear set and the output member is continuously interconnected with the second member of the fourth planetary gear set;
a first interconnecting member continuously interconnecting the first member of the first planetary gear set with a stationary member;
a second interconnecting member continuously interconnecting the second member of the first planetary gear set with the third member of the second planetary gear set;
a third interconnecting member continuously interconnecting the second member of the second planetary gear set with the second member of the third planetary gear set;
a fourth interconnecting member continuously interconnecting the first member of the second planetary gear set with the first member of the fourth planetary gear set;
a first torque transmitting device selectively engageable to interconnect at least one of the third member of the first planetary gear set and the input member with at least one of the first member of the second planetary gear set and the first member of the fourth planetary gear set;
a second torque transmitting device selectively engageable to interconnect the third member of the third planetary gear set with at least one of the first member of the second planetary gear set and the first member of the fourth planetary gear set;
a third torque transmitting device selectively engageable to interconnect the third member of the third planetary gear set with at least one of the second member of the fourth planetary gear set and output member;
a fourth torque transmitting device selectively engageable to interconnect the third member of the fourth planetary gear with the first member of the third planetary gear set; and
a fifth torque transmitting device selectively engageable to interconnect the first member of the third planetary gear set with the stationary member, and
wherein the torque transmitting devices are selectively engageable in combinations of at least three to establish at least eight forward speed ratios and at least one reverse speed ratio between the input member and the output member.

24. The transmission of claim 23 wherein the first members are sun gears, the second members are carrier members, and the third members are ring gears.

25. A transmission comprising:
an input member;
an output member;
first, second, third and fourth planetary gear sets each having first, second and third members, wherein the input member is continuously interconnected with the first member of the third planetary gear set and the output member is continuously interconnected with the third member of the fourth planetary gear set;
a first interconnecting member continuously interconnecting the first member of the first planetary gear set with a stationary member;
a second interconnecting member continuously interconnecting the second member of the first planetary gear set with the third member of the second planetary gear set;
a third interconnecting member continuously interconnecting the second member of the second planetary gear set with the second member of the third planetary gear set;
a fourth interconnecting member continuously interconnecting the first member of the second planetary gear set with the first member of the fourth planetary gear set;
a first torque transmitting device selectively engageable to interconnect at least one of the first member of the second planetary gear set and the first member of the fourth planetary gear set with the third member of the first planetary gear set;
a second torque transmitting device selectively engageable to interconnect at least one of the third member of the second planetary gear set and the second member of the first planetary gear set with at least one of the third member of the fourth planetary gear set and the output member;
a third torque transmitting device selectively engageable to interconnect at least one of the first member of the third planetary gear set and the input member with at least one of the first member of the second planetary gear set and the first member of the fourth planetary gear set;
a fourth torque transmitting device selectively engageable to interconnect the third member of the third planetary gear set with the second member of the fourth planetary gear set; and
a fifth torque transmitting device selectively engageable to interconnect the third member of the third planetary gear set with the stationary member, and
wherein the torque transmitting devices are selectively engageable in combinations of at least three to establish at least eight forward speed ratios and at least one reverse speed ratio between the input member and the output member.

26. The transmission of claim 25 wherein the third member of the first planetary gear set, the first member of the second planetary gear set, the third member of the third planetary gear set, and the second member of the fourth planetary gear set are sun gears, the second member of the first planetary gear set, the second member of the second planetary gear set, the first member of the third planetary gear set, and the first member of the fourth planetary gear set are carrier members, and the first member of the first planetary gear set, the third member of the second planetary gear set, the second member of the third planetary gear set, and the third member of the fourth planetary gear set are ring gears.

27. A transmission comprising:
an input member;
an output member;
first, second, third and fourth planetary gear sets each having first, second and third members, wherein the input member is continuously interconnected with the first member of the third planetary gear set and the output member is continuously interconnected with the third member of the fourth planetary gear set;
a first interconnecting member continuously interconnecting the first member of the first planetary gear set with a stationary member;
a second interconnecting member continuously interconnecting the second member of the first planetary gear set with the third member of the second planetary gear set;
a third interconnecting member continuously interconnecting the second member of the second planetary gear set with the second member of the third planetary gear set;

a fourth interconnecting member continuously interconnecting the first member of the second planetary gear set with the first member of the fourth planetary gear set;

a first torque transmitting device selectively engageable to interconnect the third member of the first planetary gear set with the second member of the fourth planetary gear set;

a second torque transmitting device selectively engageable to interconnect at least one of the third member of the second planetary gear set and the second member of the first planetary gear set with the third member of the third planetary gear set;

a third torque transmitting device selectively engageable to interconnect at least one of the first member of the second planetary gear set and the first member of the fourth planetary gear set with the third member of the third planetary gear set;

a fourth torque transmitting device selectively engageable to interconnect the second member of the fourth planetary gear set with at least one of the first member of the third planetary gear set and the input member;

a fifth torque transmitting device selectively engageable to interconnect the third member of the third planetary gear set with the stationary member, and wherein the torque transmitting devices are selectively engageable in combinations of at least three to establish at least eight forward speed ratios and at least one reverse speed ratio between the input member and the output member.

28. The transmission of claim 27 wherein the first member of the first planetary gear set, the first member of the second planetary gear set, the first member of the third planetary gear set, and the first member of the fourth planetary gear set are sun gears, the third member of the first planetary gear set, the third member of the second planetary gear set, the third member of the third planetary gear set, and the second member of the fourth planetary gear set are carrier members, and the second member of the first planetary gear set, the second member of the second planetary gear set, the second member of the third planetary gear set, and the third member of the fourth planetary gear set are ring gears.

29. A transmission comprising:
an input member;
an output member;
first, second, third and fourth planetary gear sets each having a sun gear, a carrier member, and a ring gear, wherein the input member is continuously interconnected with the ring gear of the first planetary gear set and the output member is continuously interconnected with the carrier member of the fourth planetary gear set;
a first interconnecting member continuously interconnecting the sun gear of the first planetary gear set with a stationary member;
a second interconnecting member continuously interconnecting the carrier member of the first planetary gear set with the ring gear of the second planetary gear set;
a third interconnecting member continuously interconnecting the carrier member of the second planetary gear set with the carrier member of the third planetary gear set;
a fourth interconnecting member continuously interconnecting the sun gear of the second planetary gear set with the sun gear of the fourth planetary gear set;
a first torque transmitting device selectively engageable to interconnect at least one of the ring gear of the first planetary gear set and the input member with at least one of the sun gear of the second planetary gear set and the sun gear of the fourth planetary gear set;

a second torque transmitting device selectively engageable to interconnect the ring gear of the third planetary gear set with at least one of the sun gear of the second planetary gear set and the sun gear of the fourth planetary gear set;

a third torque transmitting device selectively engageable to interconnect the ring gear of the third planetary gear set with at least one of the carrier member of the fourth planetary gear set and output member;

a fourth torque transmitting device selectively engageable to interconnect the ring gear of the fourth planetary gear with the sun gear of the third planetary gear set; and a fifth torque transmitting device selectively engageable to interconnect the sun gear of the third planetary gear set with the stationary member, and wherein the torque transmitting devices are selectively engageable in combinations of at least three to establish at least eight forward speed ratios and at least one reverse speed ratio between the input member and the output member.

30. A transmission comprising:
an input member;
an output member;
first, second, third and fourth planetary gear sets each having a sun gear, a carrier member, and a ring gear, wherein the input member is continuously interconnected with the carrier member of the third planetary gear set and the output member is continuously interconnected with the ring gear of the fourth planetary gear set;
a first interconnecting member continuously interconnecting the ring gear of the first planetary gear set with a stationary member;
a second interconnecting member continuously interconnecting the carrier member of the first planetary gear set with the ring gear of the second planetary gear set;
a third interconnecting member continuously interconnecting the carrier member of the second planetary gear set with the ring gear of the third planetary gear set;
a fourth interconnecting member continuously interconnecting the sun gear of the second planetary gear set with the carrier member of the fourth planetary gear set;
a first torque transmitting device selectively engageable to interconnect at least one of the sun gear of the second planetary gear set and the carrier member of the fourth planetary gear set with the sun gear of the first planetary gear set;
a second torque transmitting device selectively engageable to interconnect at least one of the ring gear of the second planetary gear set and the carrier member of the first planetary gear set with at least one of the ring gear of the fourth planetary gear set and the output member;
a third torque transmitting device selectively engageable to interconnect at least one of the carrier member of the third planetary gear set and the input member with at least one of the sun gear of the second planetary gear set and the carrier member of the fourth planetary gear set;
a fourth torque transmitting device selectively engageable to interconnect the sun gear of the third planetary gear set with the sun gear of the fourth planetary gear set; and
a fifth torque transmitting device selectively engageable to interconnect the sun gear of the third planetary gear set with the stationary member, and
wherein the torque transmitting devices are selectively engageable in combinations of at least three to establish at least eight forward speed ratios and at least one reverse speed ratio between the input member and the output member.

31. A transmission comprising:

an input member;

an output member;

first, second, third and fourth planetary gear sets each having a sun gear, a carrier member, and a ring gear, wherein the input member is continuously interconnected with the sun gear of the third planetary gear set and the output member is continuously interconnected with the ring gear of the fourth planetary gear set;

a first interconnecting member continuously interconnecting the sun gear of the first planetary gear set with a stationary member;

a second interconnecting member continuously interconnecting the ring gear of the first planetary gear set with the carrier member of the second planetary gear set;

a third interconnecting member continuously interconnecting the ring gear of the second planetary gear set with the ring gear of the third planetary gear set;

a fourth interconnecting member continuously interconnecting the sun gear of the second planetary gear set with the sun gear of the fourth planetary gear set;

a first torque transmitting device selectively engageable to interconnect the carrier member of the first planetary gear set with the carrier member of the fourth planetary gear set;

a second torque transmitting device selectively engageable to interconnect at least one of the carrier member of the second planetary gear set and the ring gear of the first planetary gear set with the carrier member of the third planetary gear set;

a third torque transmitting device selectively engageable to interconnect at least one of the sun gear of the second planetary gear set and the sun gear of the fourth planetary gear set with the carrier member of the third planetary gear set;

a fourth torque transmitting device selectively engageable to interconnect the carrier member of the fourth planetary gear set with at least one of the sun gear of the third planetary gear set and the input member; and a fifth torque transmitting device selectively engageable to interconnect the carrier member of the third planetary gear set with the stationary member, and wherein the torque transmitting devices are selectively engageable in combinations of at least three to establish at least eight forward speed ratios and at least one reverse speed ratio between the input member and the output member.

* * * * *